Jan. 14, 1958            B. BARÉNYI            2,819,768
WHEEL SUSPENSION IN MOTOR VEHICLES BY MEANS OF LEAF SPRINGS
Filed July 23, 1954
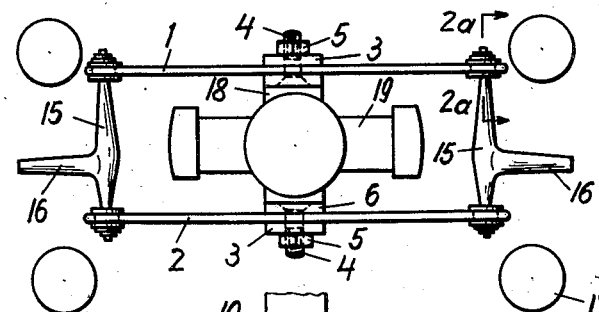
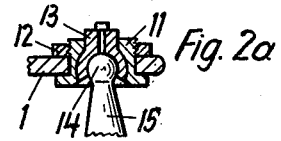
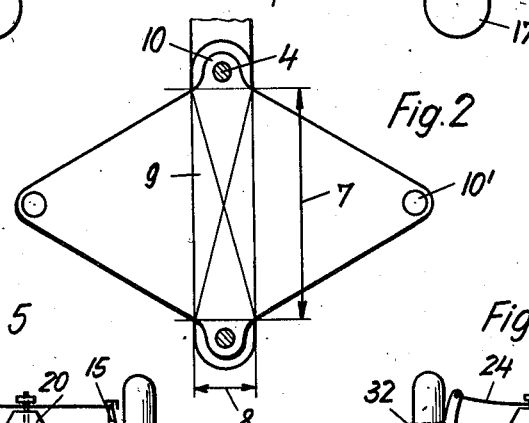
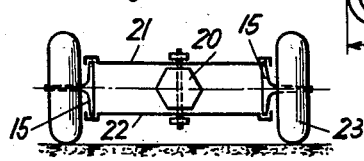
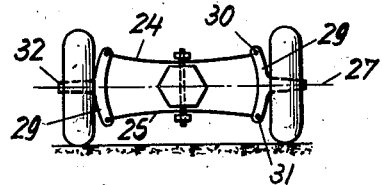
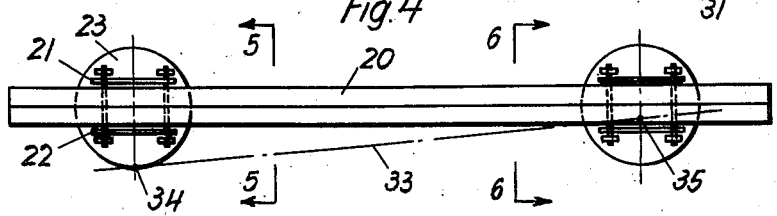
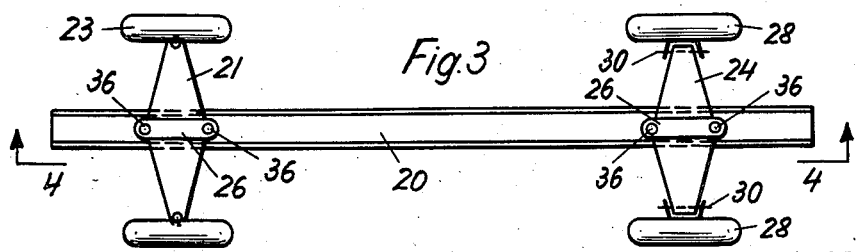
INVENTOR
BÉLA BARÉNYI
*Dicke and Craig*
BY            ATTORNEY

United States Patent Office 2,819,768
Patented Jan. 14, 1958

---

2,819,768

WHEEL SUSPENSION IN MOTOR VEHICLES BY MEANS OF LEAF SPRINGS

Bela Barényi, Stuttgart-Rohr, Germany, assignor to Daimler-Benz Aktiengesellschaft, Stuttgart-Unterturkheim, Germany Application July 23, 1954, Serial No. 445,354

6 Claims. (Cl. 180—55)

The present invention relates to wheel suspensions for motor vehicles. More particularly, it relates to a wheel suspension at least for one vehicle axis by means of upper and lower leaf springs which extend transversally of the vehicle and are of greatest width near their central portion where they are secured to the vehicle frame, and are arranged in a spaced relation one above the other so as to permit the wheel supporting elements to be mounted intermediate the ends of the two springs and to be guided thereby.

It is the object of the present invention to provide a new wheel suspension for motor vehicles by means of leaf springs which is superior to previous constructions by reason of its simplicity of construction and the reduced number of parts required therefor.

Another object of the invention is a new design and arrangement of the leaf springs of a wheel suspension which does not require any special wheel supporting element to be pivotally mounted on the vehicle body as previously required for individually suspended swinging axles.

Another object of the invention is to provide a leaf spring design for a wheel suspension whereby the respective vehicle axle, and especially the rear axle, will have the effect of a jointed cross shaft axle.

An essential feature of the invention consists in providing a ball socket in each end of the cooperating upper and lower springs, in securing such sockets by very simple means in suitable apertures in the free ends of the springs, and in mounting the wheel supporting elements at each side of the vehicle by means of ball heads in such sockets so as to be freely pivotal therein.

Another feature of the invention resides in the simple manner of securing the new leaf springs to the central longitudinal frame of the vehicle by no more than two bolts which extend through the frame and springs, and the nuts of which press on each side upon a suitable mounting plate to secure the springs tightly to the upper and lower surfaces of the frame.

The present invention has the further advantage of permitting the application of a parallelogramlike wheel suspension which has been recognized as being superior to other forms of suspensions. Such suspension may be obtained according to the invention by mounting the two cooperating leaf springs so as to extend within substantially horizontal planes and parallel with each other when the vehicle is not loaded. Substantially the same type of suspension may, however, also be used so as to obtain the effect of a jointed cross shaft axle by simply shaping or tensioning the opposite springs so as to diverge gradually relative to each other from their central point or axis, where they are secured to the longitudinal frame of the vehicle, toward their outer ends.

Further objects, features, and specific advantages of the present invention will appear from the following detailed description thereof and the accompanying drawings showing diagrammatically three different embodiments of the invention, in which—

Fig. 1 shows a front view of a wheel suspension according to the invention;

Fig. 2 is a top view of the leaf spring suspension shown in Fig. 1, with the elements pertaining to the wheel suspension being omitted for the sake of a better illustration of the invention;

Fig. 2a is a partial section along line 2a—2a of Fig. 1;

Fig. 3 is a top view of a vehicle chassis with a front wheel suspension according to a modification of the invention and a rear wheel suspension according to still another modification;

Fig. 4 shows a vertical longitudinal section along line 4—4 of Fig. 3;

Fig. 5 shows another cross section along line 5—5 of Fig. 4; while

Fig. 6 shows still another cross section along line 6—6 of Fig. 4.

Referring to the drawings, each of two rhomboidal leaf springs 1 and 2 of equal size are mounted transversally to the vehicle by means of a mounting plate 3, bolts 4, and nuts 5 on a central longitudinal frame 6 of the motor vehicle, the two leaf springs thus being disposed exactly one above the other, i. e., above and below the central frame 6. For securing the leaf springs 1 and 2 to the frame 6, they are provided with eyes 10 which are located outside of their actual mounting surfaces 9 which are formed by the length 7 and the width 8 of the mounting plates 3, so that the mounting surfaces 9 themselves are not weakened by any apertures, cut-out portions, or the like. Only at their lateral free ends, as shown particularly in Fig. 2a, each of the leaf springs 1 and 2 has a bore 10' in which a ball socket 13 is mounted by means of a socket screw 11 and an annular nut 12. Since the two springs 1 and 2 are of identical size and disposition relative to each other, the two ball sockets 13 lie within the same vertical axis and are spaced apart by the wheel supporting element 15, the upper and lower ends of which carry balls 14 fitting into sockets 13 so as to be pivotable therein. Each of the elements 15 is integral with a stub axle 16 on which the respective wheel 17 is mounted which is merely indicated in Fig. 1 by two circles.

In order to utilize the space intermediate springs 1 and 2 for a profitable purpose, the central frame 6 is provided with a recess 18 within which an engine 19 of the opposed cylinder type may be mounted in any suitable manner.

Figs. 3 to 6 illustrate a vehicle chassis consisting primarily of a central supporting frame 20 of hollow hexagonal cross section with two different wheel suspensions according to the invention, the front wheels shown at the left being provided with one modified form while those at the right show a rear wheel suspension according to another modification. For suspending the front wheels 23 so as to form at any time the opposite sides of a perfect parallelogram, the cooperating upper and lower leaf springs 21 and 22 of the front axle are mounted so as to be exactly parallel to each other and to remain in parallel horizontal planes regardless of the load to be carried by the vehicle. Even though the tendency of the vehicle body to swing outwardly when driving through a curve might be increased thereby, such parallelogramlike mounting is preferably used for wheels controlled by a steering gear, that is, especially for the front wheels, since the deflection of the springs of such a wheel suspension does not result in any centrifugal forces which might affect the operation of the steering apparatus. In accordance with the first modification of the invention shown at the left of Figs. 3 and 4, as well as in Fig. 5, a wheel supporting element 15 is mounted on each side of the vehicle between the ends of the leaf springs 21 and 22 for supporting and guiding the wheels 23. The cooperating springs 24 and 25 of the rear axle, as shown on the right side of Figs. 3 and 4, as well as in Fig. 6, are, however, mounted so as to produce the effect of a jointed cross shaft axle by extending them from the central mounting plates 26 toward the outer spring ends at a gradually increasing distance from each other. Thus, as shown particularly in Fig. 6, when seen from a horizontal plane 27 dividing the wheel suspension symmetrically and being in line with the wheel axis, the two opposite springs gradually diverge from their central axis upwardly or downwardly, respectively. Such suspension similar to a jointed cross shaft axle considerably counteracts the tendency of the vehicle body to swing outwardly when driving through curves. On the other hand, the centrifugal forces occurring at the wheels 28 when the springs are deflected cannot cause any reaction if, as is usually the case, the rear wheels are rigidly mounted and not provided with any steering apparatus. In the present case, such rigid mounting of the rear wheels 28 is produced by wheel supporting elements 29 which form a part of the stub axles 32 carrying the rear wheels 28 and are pivotally mounted on upper and lower pivots 30 and 31 respectively.

For securing each pair of leaf springs 21 and 22, and 24 and 25, respectively, to the central frame 20, only a single pair of bolts 36 is required which extend through the central frame 20 and at opposite sides thereof through the respective springs, similarly as shown in Figs. 1 and 2, to be pressed tightly against the frame 20 by mounting plates 26. Such a simple manner of mounting on the vehicle frame the entire spring mechanism of the vehicle, including the wheels and the wheel suspension, by means of no more than four bolts in combination with the new simplified design and relative arrangement of the springs considerably reduces the number of required parts as compared with prior spring and wheel suspensions, and hence the cost of manufacture of such a vehicle and of installing or repairing the entire wheel suspension.

The vehicle chassis shown in Fig. 4 also illustrates that the favorable extent of the lateral stability axis 33 connecting the instantaneous centers, which could previously be obtained only with far more complicated wheel suspensions, may also be obtained with the simple means according to the invention. Points 34 and 35 shown in Fig. 4 indicate the relative vertical position of the so-called instantaneous center of rotation of the axles.

While the foregoing description sets forth in detail what I regard as the preferred embodiments of my invention, it is to be understood that numerous changes may be made therein without departing from the spirit and scope of the invention as defined in the appended claims.

Having thus described my invention, what I claim as new is:

1. In a motor vehicle having a central longitudinal frame, a wheel suspension comprising only one upper leaf spring and one lower leaf spring extending transversely of the vehicle and being of considerable width along the central longitudinal axis of the vehicle and narrowing toward their free lateral ends, a pair of mounting plates of a length substantially equal to the width of said springs, a single pair of bolts extending through said frame along the central longitudinal axis thereof and through said upper and lower springs and said mounting plates, and a nut at least at one end of each of said bolts for pressing said plates against the outer surfaces of said springs to clamp said springs to the upper and lower surfaces of said frame respectively, said free spring ends each forming an aperture, a pair of wheel supporting elements each comprising a vertical member and a substantially horizontal member extending from said vertical member for mounting a wheel thereon, and means for pivotally supporting said wheel supporting elements on said spring ends in said apertures.

2. In a motor vehicle having a frame located along the central longitudinal axis of the vehicle, a wheel suspension comprising only one upper leaf spring and one lower leaf spring extending transversely of the vehicle and being of considerable width along the central longitudinal axis of the vehicle and narrowing toward their free lateral ends, means for fastening said springs to the opposite outer surfaces of said frame along the central longitudinal axis thereof, an engine for driving said vehicle mounted within said frame intermediate said upper and lower springs, said spring ends each forming an aperture, a pair of wheel supporting elements comprising a vertical member and a substantially horizontal member extending from said vertical member for mounting a wheel thereon, and means for pivotally supporting said wheel supporting elements on said springs ends in said apertures.

3. In a motor vehicle having a central longitudinal frame, a wheel suspension comprising one upper and one lower leaf spring extending transversely of the vehicle and being of a considerable width along the central longitudinal axis of the vehicle and narrowing toward their free lateral ends, means for securing said springs on the opposite outer surfaces of said frame along the central longitudinal axis thereof, said springs when mounted on said frame gradually diverging relative to each other from the secured center portions thereof toward said free ends, said free ends each forming an aperture, a pair of wheel supporting elements each comprising a vertical member and a substantially horizontal member extending from said vertical member for mounting a wheel thereon, and upper and lower pivot pin means for pivotally supporting said supporting elements at said springs in said apertures.

4. In a motor vehicle having a frame in the longitudinal center axis of the vehicle, front and rear wheels, a wheel suspension for each of said wheels comprising one upper and one lower leaf spring extending transversely of the vehicle and being of considerable width along the central axis of the vehicle and becoming narrower toward the free lateral ends thereof, means for securing said springs on the opposite outer surfaces of said frame along the central longitudinal axis thereof, the springs for the suspension of said front wheels being parallel to each other and forming an aperture each at the ends thereof, a wheel supporting element arranged in each of said apertures, each wheel supporting element comprising a vertical member and a substantially horizontal member extending from said vertical member for mounting one of said wheels thereon, and means including an upper and a lower ball socket for pivotally supporting the upper and lower end of each vertical member of said first-mentioned wheel supporting elements in the apertures of said last-mentioned spring ends, and the springs for the suspension of said rear wheels gradually diverging relative to each other from the secured center portions thereof toward the free ends thereof, said last-mentioned free ends forming an aperture, further wheel supporting elements each comprising a vertical member and a substantially horizontal member extending from said vertical member for mounting one of said wheels thereon, and upper and lower pivot pins for pivotally supporting the upper and lower ends of the vertical members of said further supporting elements in the apertures of the free ends of the springs for said rear wheels.

5. In a motor vehicle having a frame member disposed in the central vertical longitudinal plane of the vehicle, a wheel suspension comprising only one upper leaf spring and one lower leaf spring extending transversely of the vehicle and fastened to said frame member, said springs being of considerable width along their central axes and narrowing toward their lateral ends, upwardly directed apertures formed in said spring ends, a pair of wheel supporting elements each comprising a vertical member and a substantially horizontal member extending from said vertical member for mounting a wheel thereon, and means for pivotally mounting said wheel supporting elements on said spring ends in said apertures, said mounting means including a bolt pivotally mounted on each end of each said vertical member and extending substantially vertically through a corresponding aperture formed in said spring ends.

6. In a motor vehicle having a frame in the central longitudinal axis of the vehicle, a wheel suspension comprising only one upper leaf spring and one lower leaf spring extending transversely of the vehicle and being of considerable width along the central longitudinal axis of the vehicle and narrowing toward their free lateral ends, means for mounting said springs on the opposite outer surfaces of said frame along the central longitudinal axis thereof, the mounting surfaces of said springs being continuous and unbroken, said spring ends each being provided with an upwardly directed aperture, a pair of wheel supporting elements each comprising a vertical member and a substantially horizontal member extending from said vertical member for mounting a wheel thereon, and means including an upper and lower pivot pin for pivotally supporting the upper and lower end of said vertical member on said spring ends in said apertures, said means including bolt means connected to the end portions of each said vertical member extending in a substantially vertical direction into corresponding apertures formed in said spring ends.

References Cited in the file of this patent

UNITED STATES PATENTS

| | | |
|---|---|---|
| 1,303,213 | Lea | May 6, 1919 |
| 1,310,193 | Krafve | July 15, 1919 |
| 1,450,378 | Kelly | Apr. 3, 1923 |
| 1,526,481 | Krieger | Feb. 17, 1925 |
| 1,706,556 | Wright | Mar. 26, 1929 |
| 1,991,619 | Mackenzie | Feb. 19, 1935 |

FOREIGN PATENTS

| | | |
|---|---|---|
| 271,017 | Switzerland | Dec. 16, 1950 |